United States Patent [19]

Looschen

[11] 4,097,859
[45] Jun. 27, 1978

[54] THREE-LEVEL TO TWO-LEVEL DECODER

[75] Inventor: Floyd William Looschen, Laguna Beach, Calif.

[73] Assignee: Burroughs Corporation, Detroit, Mich.

[21] Appl. No.: 737,783

[22] Filed: Nov. 1, 1976

[51] Int. Cl.² .......................................... H03K 13/00
[52] U.S. Cl. ........................ 340/347 DD; 325/38 A; 235/304
[58] Field of Search ............. 340/347 DD; 325/38 A; 178/66, 67, 68; 360/40, 41, 42; 329/109; 332/11 R

[56] References Cited

U.S. PATENT DOCUMENTS 3,866,147  2/1975  De Couvreur ................. 325/38 A
3,927,401  12/1975  McIntosh ..................... 340/347 DD Primary Examiner—Charles D. Miller
Attorney, Agent, or Firm—Nathan Cass; Kevin R. Peterson; Edward J. Feeney, Jr.

[57] ABSTRACT

Improved three-level to binary decoding means for use in decoding a three-level digital data signal received from a transmission line in a serial digital data transmission channel. Uniform loading and controlled timing of the decoding are provided.

6 Claims, 8 Drawing Figures

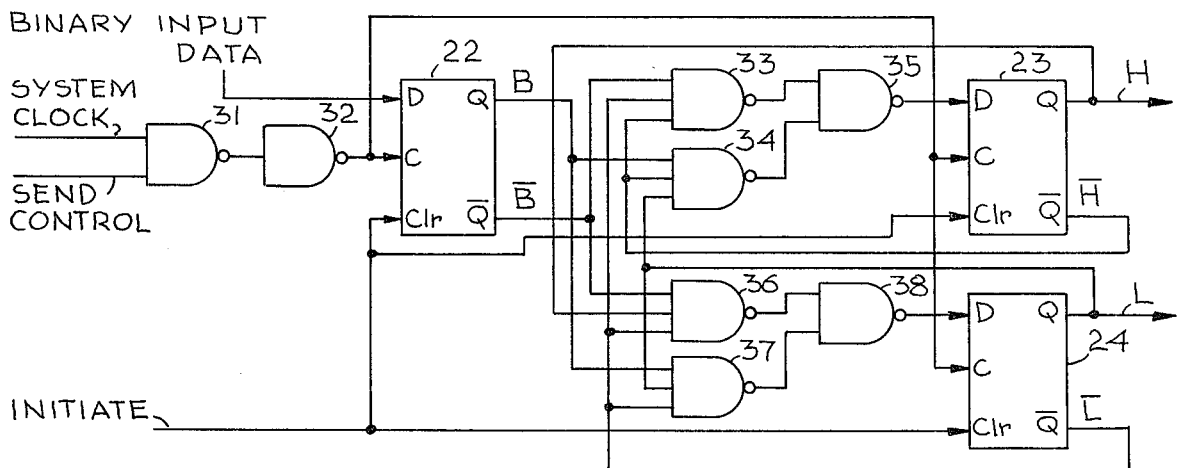
Fig. 3
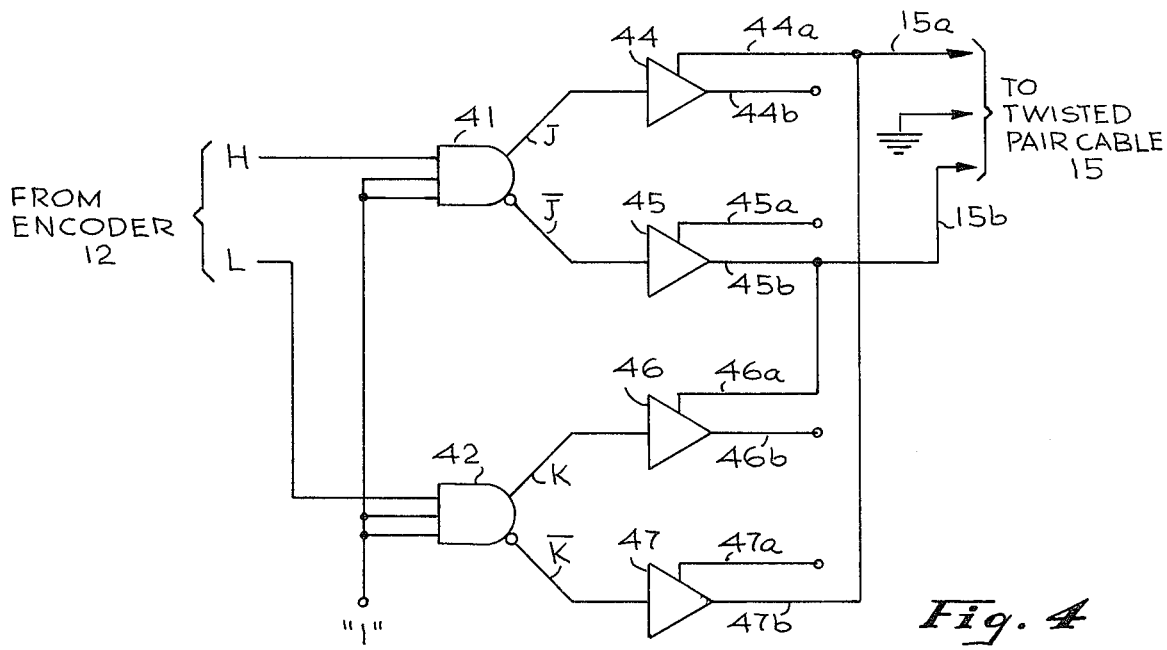
Fig. 4
Fig. 5

THREE-LEVEL TO TWO-LEVEL DECODER

CROSS REFERENCE TO RELATED APPLICATIONS

The following commonly assigned patent applications are related to this application:

Title: — Three-Level Serial Digital Data Communication System
Inventor: — Floyd William Looschen
Ser. No.: — 737,732
Filed: — Nov. 1, 1976

Title: — Encoding and Driving Means For Use In A Three-Level Digital Data Communication System
Inventor: — Floyd William Looschen
Ser. No.: — 737,731
Filed: — Nov. 1, 1976

Title — Receiving Means For Use In A Digital Data Communication System
Inventor: — Floyd William Looschen
Ser. No.: — 737,730
Filed: — Nov. 1, 1976

BACKGROUND OF THE INVENTION

This invention relates generally to improved digital communication means and methods, and more particularly to improved means and methods useful for providing reliable, high speed communication of digital data between units in a digital data processing system.

Modern data processing systems have a number of different units between which binary digital data must be reliably communicated at high speed. For example, in a modern data processing system, it may typically be required to provide for asynchronously controlled digital data communication between a data processing unit and one or more remote units located some 300 feet away.

Although parallel digital data communication has been employed in the prior art for providing digital data communication between data processing units, the current trend is toward the use of serial transmission techniques because of the cost and inconvenience of parallel communication systems, particularly where communication is required to be provided over distances greater than 100 feet. However, in order to make such serial digital data communication compatible with the speed capabilities of modern data processing systems, it is important that the serial digital data transmission system be capable of providing relatively high digital data transmission rates such as, for example, an effective digital data transmission rate of 20 megahertz over a distance of 300 feet.

Although a variety of approaches and circuitry are known in the art for implementing a serial digital data transmission system, the prior art has nevertheless experienced considerable difficulties in providing an economically feasible serial data transmission system capable of reliable performance at the high digital data transmission rates and over the distances required by modern day computer systems.

SUMMARY OF THE PRESENT INVENTION

In accordance with the present invention, improved means and methods are provided for implementing a serial digital data transmission system in a manner which satisfies the aforementioned performance requirements of modern day data processing systems.

In a particular preferred embodiment incorporating the invention, a direct-coupled, binary serial digital data transmission channel is provided in which a shielded twisted wire cable is used as the transmission line and the binary data to be transmitted on the cable is encoded into a self-clocking three-level signal code which requires only one signal transition for each data bit transmitted, thereby permitting maximum use to be made of cable and system bandwidth capabilities. Also, the selected three-level code facilitates error detection.

This patent application is primarily directed to improved decoding means for use at the receiving end of the above summarized serial data transmission channel. In a preferred embodiment, a three-level to binary decoder is provided which provides for uniform loading of the received input signals as well as separating the detection of data presence from the decoding of the received three-level signal so that regeneration of the clock and production of the binary output data can be separately controlled to suit the speed and timing requirements of a variety of situations.

The specific nature of the invention as well as other objects, features, advantages and uses thereof will become readily apparent from the following description of a preferred embodiment of the invention taken in conjunction with the accompanying drawings.

DESCRIPTION OF THE DRAWINGS

FIG. 3 is an electrical schematic diagram of a preferred embodiment of the Binary To Three-Level Encoder illustrated in block form in FIG. 1.

FIG. 4 is a schematic electrical diagram illustrating a preferred embodiment of the Three-State Differential Driver illustrated in block form in FIG. 1.

FIG. 5 is a table illustrating the operation of the Three-State Differential Driver of FIG. 4.

DETAILED DESCRIPTION

Like numbers and characters refer to like elements throughout the figures of the drawings.

Figure 1:
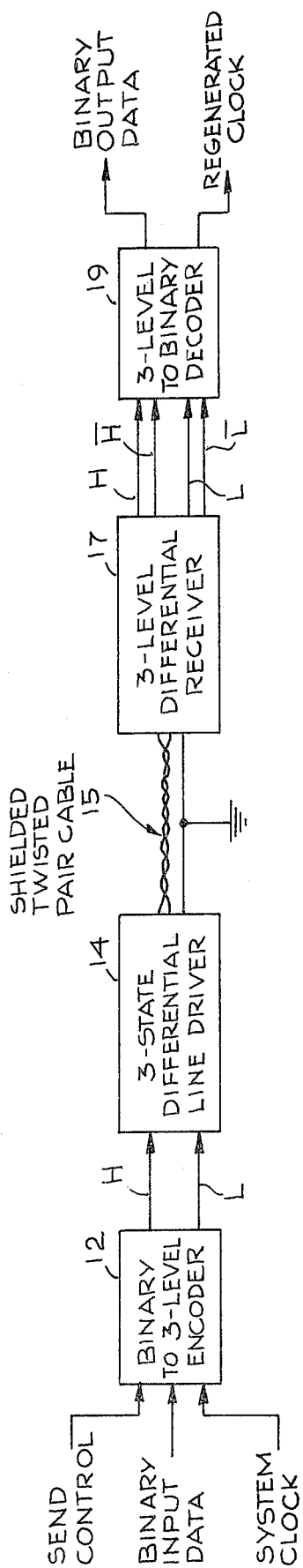
FIG. 1 is a block and schematic diagram illustrating a preferred embodiment of a serial digital data communication channel in accordance with the invention.
Figure 2:
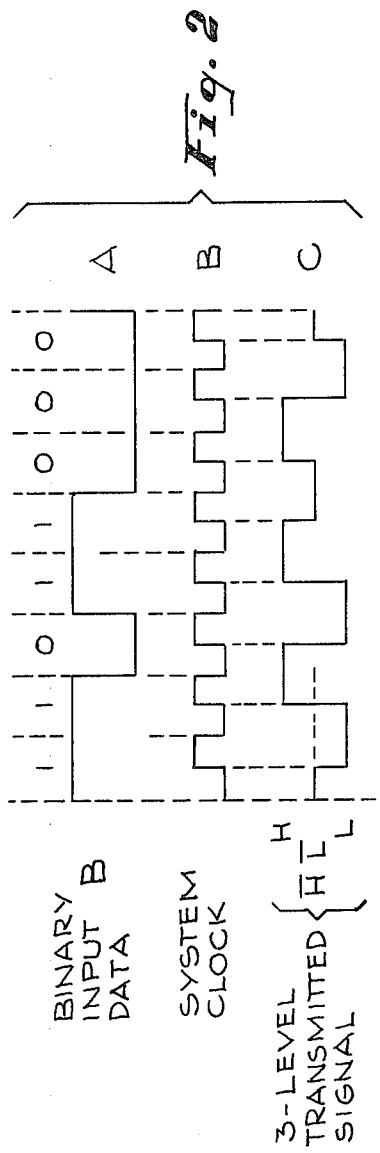
FIG. 2 is a series of idealized graphs illustrating a preferred manner of encoding binary data into a three-level transmission signal in accordance with the invention.

Reference is initially directed to the preferred embodiment of the serial digital data communication channel illustrated in FIG. 1. As shown, binary input data to be transmitted is applied to a Binary To Three-Level Encoder 12 along with the system clock and a Send Control signal. The Send Control signal defines the time period during which it is desired to transmit the binary input data. The binary input data may typically have the form illustrated in graph A in FIG. 2. A typical system clock is illustrated in graph B. The waveforms in FIG. 2 are idealized for purposes of simplicity in that each level change is shown as a vertical transition, the showing of actual rise and fall times being unnecessary to an understanding of the invention.

The resulting digital output signals H and L produced by the Binary To Three-Level Encoder 12 in response to the binary input data are applied to a Three-State Differential Line Driver 14 which develops a three-level signal for application to a conventional shielded twisted pair cable 15. Graph C in FIG. 2 illustrates a typical three-level signal obtained in response to the particular illustrative non-return-to-zero binary input data signal 1101100 shown in graph A. It will be understood from the graphs of FIG. 2 that the encoding of the binary input data is such that a binary "1" is encoded as a transition of two levels up if the previous level of the three-level signal (graph C) is low (i.e., L), or by a transition of one level down if the previous level of the three-level signal is high (i.e., H) or is neither high nor low (i.e., $\bar{H}\bar{L}$). A binary "0" is encoded as a transition of two levels down if the previous level of the three-level signal is high (i.e., H), or by a transition of one level up if the previous level of the three-level signal is low (i.e., L) or is neither high nor low (i.e., $\bar{H}\bar{L}$). The resultant digital outputs H and L of the Binary To Three-Level Encoder 12 are accordingly representable by the following Boolean encoding equations:

$$H = \bar{B}\,\bar{H}_p\bar{L}_p + B\,\bar{H}_p L_p \qquad (1)$$

$$L = \bar{B}\,H_p\bar{L}_p + B\,\bar{H}_p\bar{L}_p \qquad (2)$$

wherein $B$ and $\bar{B}$ in the above equations respectively correspond to "1" and "0" binary values of the binary input signal and $H_p$, $\bar{H}_p$, $L_p$ and $\bar{L}_p$ represent previous values of $H$ and $L$.

It will be evident that the above described three-level encoding employed is advantageous in that it is self-clocking and requires only one transition for each binary digit transmitted, thereby requiring a transmission frequency which is no greater than that of the binary input data. Preferred embodiments of the Binary To Three-Level Encoder 12 and the Three-State Differential Driver 14 in FIG. 1 are illustrated in FIGS. 3 and 4, respectively, and will be described hereinafter.

At the receiving end of the cable 15 in FIG. 1, the received three-level digital signal transmitted by the Three-State Differential Driver 17 is applied to a Three-State Differential Receiver 17 which produces digital output signals H, $\bar{H}$, and L and $\bar{L}$ representative of the levels of the three-level digital signal illustrated in graph C of FIG. 2. The digital output signals H, $\bar{H}$, L and $\bar{L}$ are applied to a Three-Level To Binary Decoder 19 for decoding these signals back into binary form and for providing a regenerated clock. An example of appropriate Boolean decoding equations are as follows:

$$\text{Data Present} = H\bar{H}_p + \bar{H}H_p + L\bar{L}_p + \bar{L}L_p \qquad (3)$$

$$(\text{Data} = \text{"1"}) = \bar{H}L\,\bar{H}_p\bar{L}_p + H\bar{L}\,\bar{H}_pL_p + \bar{H}\bar{L}\,H_p\bar{L}_p \qquad (4)$$

$$\text{Error} -\!\!- = HL \qquad (5)$$

wherein $H$ and $L$ are the present levels of the received three-level waveform, and $H_p$ and $L_p$ are the previous levels of this waveform. The "Data Present" equation above is useful for producing the regenerated clock. The "Error" equation is useful for error detection.

Figure 6:
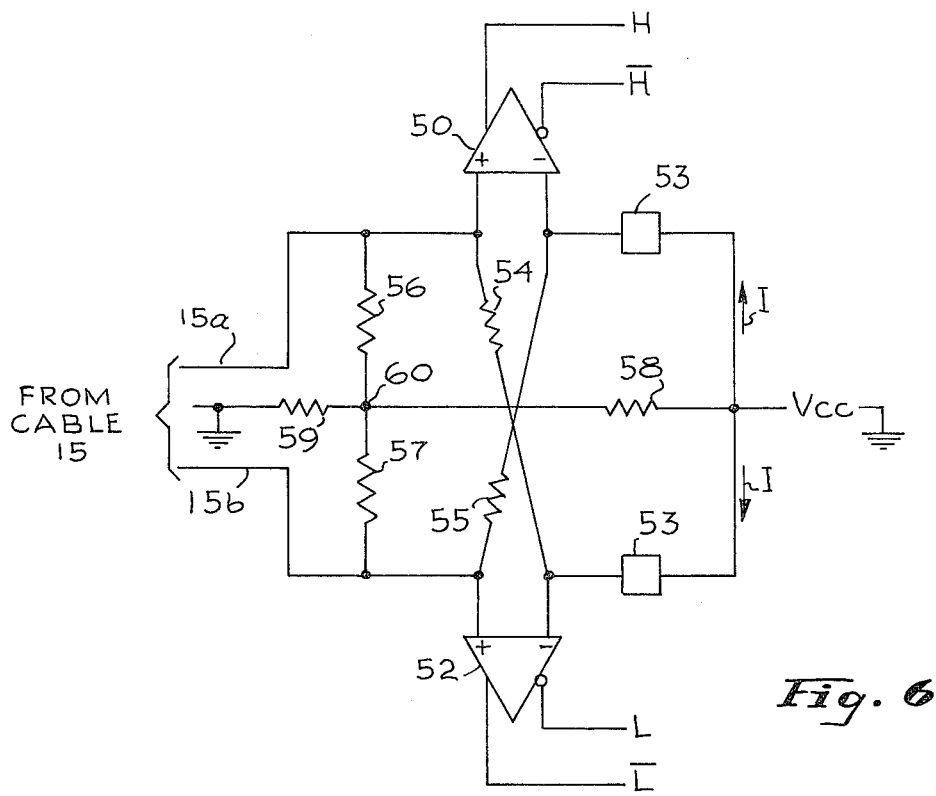
FIG. 6 is a schematic electrical diagram of a preferred embodiment of the Three-State Differential Receiver illustrated in block form in FIG. 1.

Particularly advantageous embodiments of the Three-State Differential Receiver 17 and the Three-Level To Binary Decoder 19 are illustrated in FIGS. 4 and 6, respectively, and will be described hereinafter.

Reference is now directed to FIG. 3 which illustrates a preferred embodiment of the Binary To Three-Level Encoder 12 shown in block form in FIG. 1. As shown, the Encoder 12 comprises a plurality of D-type flip-flops 22–24 operating in conjunction with a plurality of NAND gates 31–37 to provide encoding of the input binary data in accordance with the previously presented encoding equations (1) and (2). For structural convenience, D-type flip-flops and NAND gate logic are employed throughout the Encoder 12. Accordingly, as is well known, in order to implement sums of logical AND products using NAND gates (such as is required by the encoding equations), each of the inputs to be ANDed are first applied to a respective first level NAND gate (e.g., inputs $\bar{D}$, $\bar{H}$, $\bar{L}$ applied to NAND gate 33 in FIG. 3 and inputs $B\,\bar{H}\,L$ applied to AND gate 34). The resulting outputs of these first level AND gates are then applied to a next following NAND gate (e.g., NAND gate 35 in FIG. 3) to provide an output corresponding to the sum of the logical AND products of the inputs (e.g., $\bar{D}\,\bar{H}\,\bar{L} + D\,\bar{H}\,\bar{L}$ at the output of NAND gate 35 as required by encoder equation (1)).

As is also well known, a D-type flip-flop operates in response to each clock signal (graph B in FIG. 2) applied to its clock input C to cause its Q and $\bar{Q}$ outputs to be switched to "1" and "0", respectively, (if not already in these states) when binary data applied to its D input is a "1" at the time the clock occurs, and vice versa when the binary data applied to its D input is a "0" when the clock occurs. For purposes of the present description, it is assumed that each D-type flip-flop is triggered in response to the leading edge of each clock pulse. A D-type flip-flop also typically includes a clear and/or preset input designated as "CLR" and "PR" in the drawings for respectively clearing the flip-flop (i.e., setting Q = 0, $\bar{Q}$ = 1) or presetting the flip-flop (i.e., setting Q = 1, $\bar{Q}$ = 0).

It will thus be understood from the foregoing that the operation of the Encoder 12 of FIG. 3 is such that the leading edge of the Send Control signal initiates the encoding operation by enabling NAND gate 31 so as to cause the system clock to be applied via NAND gates 31 and 32 to the clock input C of flip-flop 22. Flip-flop 22 responds to the first appearing clock to produce outputs designated as B and $\bar{B}$ in FIG. 3 representative of the state of the binary input data (graph A, FIG. 2), B and $\bar{B}$ being "1" and "0" respectively, when the binary input data is a "1", and vice versa, when the binary input data is a "0". Flip-flops 23 and 24 in FIG. 3 serve to provide respective signals H and L at their Q outputs for representing the high and low levels of the encoded three-level digital signal (graph C, FIG. 2) to be provided in response to the binary input data (graph A, FIG. 2). NAND gates 33–38 serve to combine the data outputs B and $\bar{B}$ of flip-flop 22 with the H, $\bar{H}$, L and $\bar{L}$ outputs of flip-flops 23 and 24 in accordance with the previously set forth encoding equations (1) and (2) so that the outputs H and L will properly represent the encoded three-level digital signal desired from the Encoder 12, such as illustrated by graph C in FIG. 2.

As shown in FIG. 1, the H and L outputs produced by the Encoder 12, such as described above, are applied to a Three-State Differential Driver 14, a particularly advantageous embodiment of which is illustrated in FIG. 4 and will next be described.

It will be understood that it is important that the Three-State Differential Driver 14 be able to provide high speed, reliable transmission of the encoded three-level signal on the shielded twisted pair cable 15 (FIG. 1), as well as a high level of common mode rejection. Known devices have presented difficulties in that they tend to have significantly different and unsymmetrical propagation delays when switching among the various states required for transmission of the encoded three-level signal, thereby limiting speed and reliability in certain applications. The preferred embodiment of FIG. 4 overcomes this problem by employing a pair of dual differential drivers which are connected in a particularly advantageous manner such that similar and symmetrical delays are provided for all transitions.

Now considering the Three-State Differential Line Driver 14 shown in FIG. 4 in more detail, it will be seen that the Line Driver 14 includes a pair of input AND gates 41 and 42 to which the digital signal outputs H and L received from the Encoder 12 are respectively applied, a further advantage of the Line Driver 14 of FIG. 4 being that only the two inputs H and L are required. The remaining inputs of the AND gates 41 and 42 are connected together to a signal level corresponding to a binary "1" so as to maintain both of the gates 41 and 42 in an enabled condition.

Each of the AND gates 41 and 42 in FIG. 4 has a pair of inverse binary signal outputs indicated by J and $\bar{J}$ for AND gate 41, and by K and $\bar{K}$ for AND gate 42. The J and $\bar{J}$ outputs of AND gate 41 are applied to a first differential line driver comprised of amplifiers 44 and 45, and the K and $\bar{K}$ outputs of AND gate 42 are applied to a second differential line driver comprised of amplifiers 46 and 47. Each of the amplifiers 44–47 provides two signal outputs having respective "a" and "b" designations in FIG. 4. The construction and operation of each of the amplifiers 44–47 is such that: (1) when the amplifier input is at a "1" binary level, its "a" output is at a high voltage level while its "b" output exhibits a high impedance; and (2) when the amplifier input is at a "0" binary level, its "b" output is at a low voltage level while its "b" output exhibits a high impedance. Accordingly, the amplifier outputs obtained in response to the inputs H and L will be as given in the table of FIG. 5 wherein H represents a high level amplifier output, L represents a low level amplifier output, and Z represents a high impedance amplifier output.

The amplifier outputs in the Line Driver of FIG. 4 are connected to provide for driving the cable 15 with the desired three-level signal, such as illustrated in graph C of FIG. 2. This is accomplished by connecting amplifier outputs 44a and 47b together for connection to one side 15a of the cable 15, and by connecting amplifier outputs 45b and 46a together for connection to the other side 15b of the cable 15. These amplifier output connections are indicated by lines 48 and 49 in the table of FIG. 5 which also gives in its last column the resulting three-level signals thereby applied to the cable by the Line Driver 14 in response to the H and L input signals.

As pointed out previously, the arrangement of FIG. 4 permits achieving similar and symmetrical delays for the transitions required to produce the desired three-level signal for application to the cable 15. In addition, because of the balanced configuration of the elements of FIG. 4, a high common mode rejection capability is achieved. Implementation of the Line Driver 14 of FIG. 4 can be readily accomplished, for example, using a Fairchild μA9614 Dual Differential Line Driver integrated circuit which contains appropriate AND gates and amplifers for use in providing the AND gates 41 and 42 and the amplifiers 44–47 illustrated in FIG. 4.

Next to be considered in connection with FIG. 6 is a particularly advantageous embodiment of the Three-Level Differential Receiver 17 shown in block form in FIG. 1. The Receiver 17 is basically comprised of differential amplifiers 50 and 52 having respective thresholds provided so that they appropriately sense the levels of the three-level signal (graph C, FIG. 2) received from the cable 15 for producing the respective output signals H and $\bar{H}$ from amplifier 50 and L and $\bar{L}$ from amplifier 52.

An important feature of the Receiver 17 of FIG. 6 resides in the specific manner in which the inputs of the differential amplifiers 50 and 52 are biased to provide appropriate thresholds for the received three-level signal without degrading the high common mode rejection capability of the differential amplifiers 50 and 52, or the high input impedance thereof. As illustrated in the preferred embodiment of FIG. 6, this is accomplished in accordance with the invention by providing a biasing arrangement employing a pair of cross-coupled biasing resistors 54 and 55 fed by a respective pair of constant currents I. More specifically, biasing resistor 54 has one end connected to the positive input of differential amplifier 50 and the other end connected to the negative input of differential amplifier 52, while biasing resistor 55 has one end connncted to the positive input of differential amplifier 52 and the other end connected to the negative input of differential amplifier 50.

The constant currents I in the Receiver 17 of FIG. 6 are typically provided, for example, using a pair of high impedance semiconductor elements 53, such as commercially available IN5311 diodes, having one end connected to an appropriate d-c voltage Vcc and the other end connected to a respective one of the pair of biasing resistors 54 and 55, the positive inputs of the differential amplifiers 50 and 52 being connected across the cable lines 15a and 15b. The thresholds of the differential amplifiers 50 and 52 are controllable by appropriate choice of the biasing resistors 54 and 55. The amplifiers 50 and 52 may typically be implemented using a 55/75107A Fairchild Dual Line Receiver integrated circuit chip.

The remaining portions of the Receiver 17 of FIG. 6 includes series-connected resistors 56 and 57 each equal to one-half the characteristic impedance of the cable 15 so that the cable 15 is appropriately terminated by its characteristic impedance. Also included is a resistor 58 connected between Vcc and the junction 60 of resistors 56 and 57, and a resistor 59 connected between this same junction 60 and circuit ground. The values of resistors 58 and 59 are chosen to provide an appropriate voltage at junction 60 which will prevent common mode signal generation when the Driver 14 (FIGS. 1 and 4) is switched between its various states in producing the three-level transmission signal applied to the cable 15.

Figure 7:
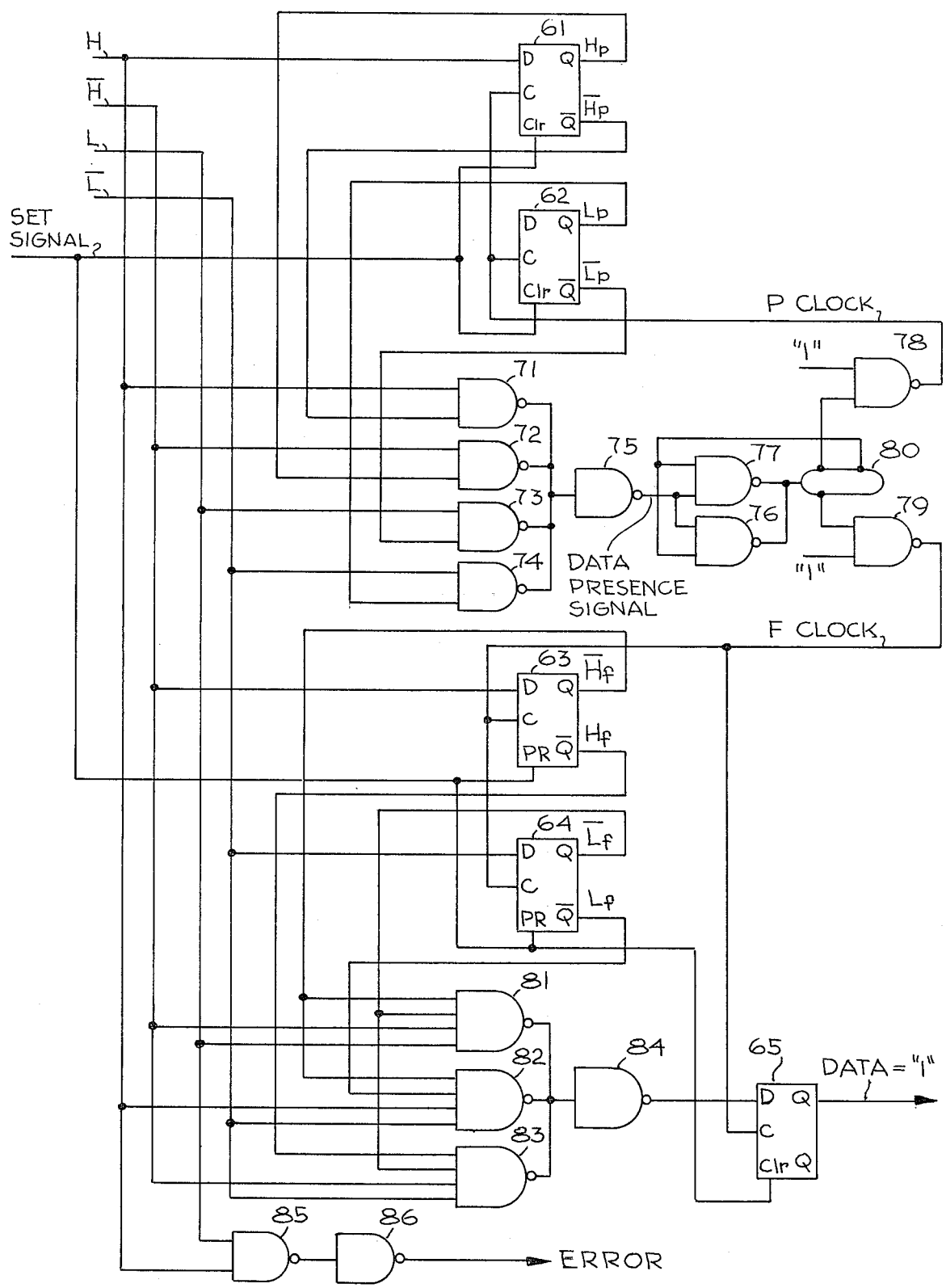
FIG. 7 is a schematic electrical diagram of a preferred embodiment of the Three-Level To Binary Decoder illustrated in block form in FIG. 1.

Reference is next directed to FIG. 7 which illustrates a particularly advantageous embodiment of the Three-Level To Binary Decoder 19 shown in block form in FIG. 1. Similarly to the previously described Encoder 12 of FIG. 3, the Decoder 19 is implemented using D-type flip-flops and NAND gates. More specifically, Decoder 19 comprises D-type flip-flops 61–65 and NAND gates 71–83 which are interconnected to implement the previously set forth decoding equations (3), (4) and (5). Particular advantage resides in the manner in which the Decoder 19 of FIG. 7 provides for decoding the three-level signal received from the Receiver 17 (FIGS. 1 and 6) in a manner such that the detection of data presence, regeneration of the clock, and production of the binary output data can be separately controlled to suit the speed and timing requirements of a variety of situations.

It will be understood from FIG. 7 that NAND gates 71–75 serve to logically combine the inputs H, $\bar{H}$, L and $\bar{L}$ applied thereto to produce a Data Presence signal (Decoder equation (3)) at the output of NAND gate 75. Values of H, $\bar{H}$, L and $\bar{L}$ for a typical three-level signal from the Receiver 17 are illustrated by graph A of FIG. 8. As was the case for the graphs of FIG. 2 the graphs of FIG. 8 are idealized in that rise and fall times of the waveforms are shown as vertical transitions.

Figure 8:
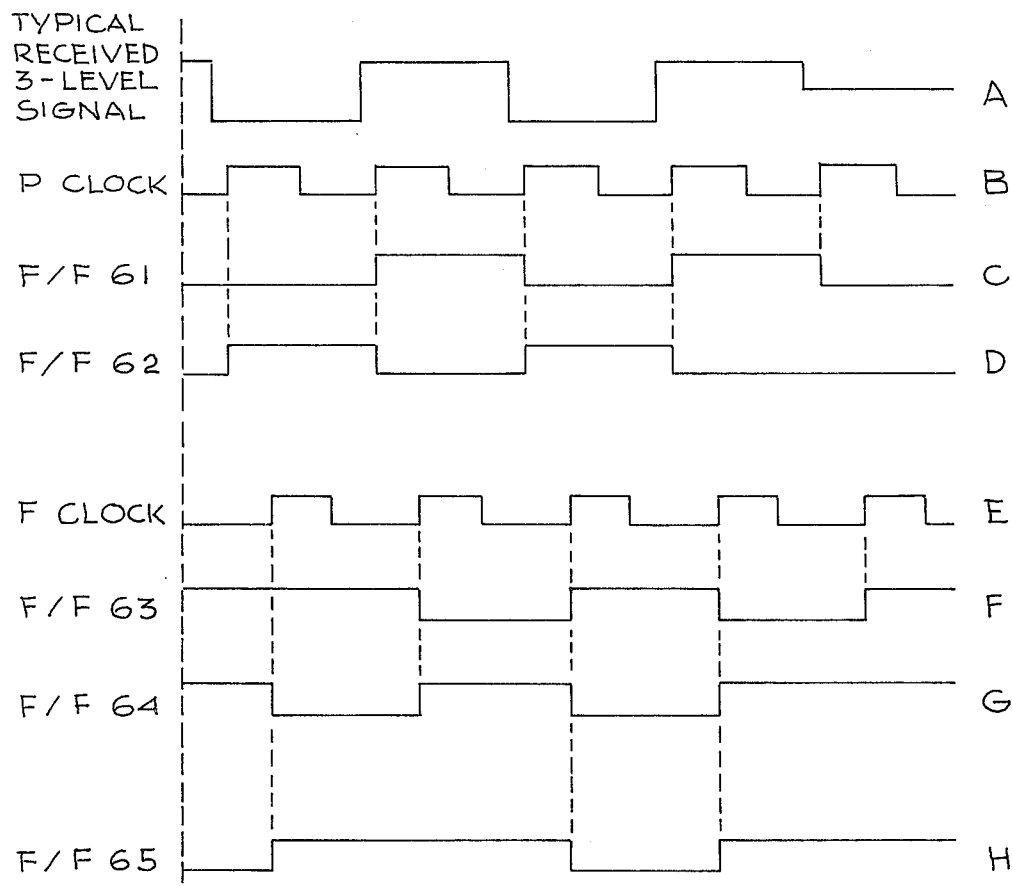
FIG. 8 is a series of idealized graphs illustrating the operation of the Three-Level To Binary Decoder of FIG. 7.

The Data Presence signal at the output of NAND gate 75 is used to produce a P clock signal, such as illustrated by graph B of FIG. 8, by applying the Data Presence signal via parallel connected NAND gates 76 and 77 to a delay line 80, and appropriately delayed output thereof being applied to a NAND gate 78. This delay is chosen so as to insure that the input signals H and L respectively applied to the data inputs of flip-flops 61 and 62 have stabilized when the P clock occurs. A later occurring output of the delay line 80 is fed back to the inputs of NAND gates 76 and 77 so as to cause the P clock (graph B, FIG. 8) to be terminated at a time appropriately chosen to accommodate the frequency of the received three-level signal (graph A, FIG. 8).

Flip-flops 61 and 62 in FIG. 7 operate in response to the P clock and input signals H and L respectively applied to their data inputs to provide output signals $H_p$, $\bar{H}_p$ and $L_p$, $\bar{L}_p$ representative of the previous level of the received three-level signal. NAND gates 71–75 combine these previous level signals $H_p$, $\bar{H}_p$, $L_p$ and $\bar{L}_p$ with input signals H, $\bar{H}$, L and $\bar{L}$ in accordance with decoder equation (1) to produce the Data Presence signal appearing at the output of NAND gate 75 which, in conjunction with the delay line 80, is used to produce the P clock as described previously. Graphs C and D in FIG. 8 illustrate typical operation of flip-flops 61 and 62 for the typical received three-level signal illustrated in graph A of FIG. 8. It is to be understood that a set signal is applied to the clear input of flip-flops 61 and 62 to initially set these flip-flops to a cleared state (i.e., $Q = 0$, $\bar{Q} = 1$). Such a set signal may be derived, for example, in response to initially turning on power.

Having described how the Decoder 19 of FIG. 7 provides for detecting data presence, it will next be described how the Decoder 19 advantageously provides for separately decoding the received three-level signal into binary form in a manner so as not to burden or otherwise interfere with the above described detection of data presence and generation of the P clock. For this purpose an appropriate F clock (graph E, FIG. 8) is derived from the delay line 80 via NAND gate 79 with a delay chosen to accommodate the particular characteristics of the data decoding portion of the Decoder 19 comprised of flip-flops 63–65 and NAND gates 81–84. Flip-flops 63 and 65 serve a similar purpose as flip-flops 61 and 62 in providing outputs $H_f$, $\bar{H}_f$, $L_f$ and $\bar{L}_f$ representative of the previous level of the received three-level signal. However, in order to provide more uniform loading of the input signals, the data decoding portion of the Decoder 19 is designed so that flip-flops 63 and 64 have inputs $\bar{H}$ and $\bar{L}$ applied to their respective data inputs, while in the data presence detecting portion of the Decoder 19, the design is such that flip-flops 61 and 62 have inputs H and L applied to their respective data inputs, thereby achieving uniform loading of the inputs H, $\bar{H}$, L and $\bar{L}$.

Continuing with the description of the decoding portion of the Decoder 19 of FIG. 7, it will be understood that, in order to accommodate the applied inputs H and L, flip-flops 63 and 64 are initially preset by the set signal to an opposite state from that of flip-flops 61 and 62 (i.e., $Q = 1$, $\bar{Q} = 0$). The previously set forth (Data = "1") decoder equation (4) may be rewritten to correspond to the particular outputs $H_f$, $\bar{H}_f$, $L_f$ and $\bar{L}_f$ of flip-flops 63 and 64 as follows:

$$\text{(Data = "1")} = \bar{H}L\bar{H}_f\bar{L}_f + H\bar{L}\bar{H}_fL_f + \bar{H}LH_f\bar{L}_f \quad (6)$$

It will be evident that inputs H, $\bar{H}$, L and $\bar{L}$ and outputs $H_f$, $\bar{H}_f$, $L_f$ and $\bar{L}_f$ of flip-flops 63 and 64 are appropriately applied to NAND gates 81–84 so as to implement the (Data = "1") decoder equation (6) above and thereby provide an input to the data input of flip-flop 65 which will result in the desired decoded binary signal being produced at the Q output thereof. Graphs F, G and H in FIG. 8 respectively illustrate typical operation of flip-flops 63–65 in response to the F clock illustrated in graph E of FIG. 8 for the typical received three-level signal illustrated in graph A of FIG. 8.

As also shown in FIG. 7, inputs H and L may be logically combined by additional NAND gates 85 and 86 in accordance with the previously set forth Error decoding equation (5) to provide a signal indicating the presence of an error in the received signal inputs.

Although this description has primarily been directed to particular preferred embodiments of the invention, it will be understood that many modifications and variations in construction, arrangement and use are possible without departing from the true spirit of the present invention. The present invention is accordingly to be considered as including all modifications and variations coming within the scope of the appended claims.

What is claimed is:

1. For use in a three-level digital data transmission system, the combination comprising:
    means for providing binary signals H, $\bar{H}$, L and $\bar{L}$ indicative of the levels of a self-clocking three-level digital signal having high, low and intermediate levels;
    means responsive to said H, $\bar{H}$, L and $\bar{L}$ signals for detecting data presence;
    means responsive to the detection of data presence for generating a clock signal at a predetermined time after the detection of data presence; and
    means responsive to said H, $\bar{H}$, L and $\bar{L}$ signals and said clock signal for producing a binary output signal representative of a decoded binary form of said three-level signal.

2. The invention in accordance with claim 1, wherein said means responsive to the detection of data presence includes a delay line.

3. The invention in accordance with claim 1, wherein said means for detecting data presence and said means for producing said binary output signal respectively operate in accordance with the following Boolean equations:

$$\text{Data Present} = H\bar{H}_f + \bar{H}H_f + L\bar{L}_f + \bar{L}L_f$$

$$(\text{Data} = \text{"1"}) = \overline{H}L\ \overline{H}_p\overline{L}_p + H\overline{L}\overline{H}_pL_p + \overline{H}\overline{L}H_pL_p$$

wherein $H$ and $L$ are present values of said three-level signal and $H_p$ and $L_p$ and $H_f$ and $L_f$ represent previous values of said three-level signal.

4. The invention in accordance with claim 3,
wherein said means for detecting data presence includes first and second flip-flops responsive to said H and L signals for generating said $H_p$, $\overline{H}_p$, $L_p$ and $\overline{L}_p$ signals; and
wherein said means for producing a binary output signal includes third and fourth flip-flops responsive to said $\overline{H}$ and $\overline{L}$ signals and said clock signal for generating said $H_f$, $\overline{H}_f$, $L_f$ and $\overline{L}_f$ signals.

5. The invention in accordance with claim 4, wherein said means for detecting data presence includes means for clocking said first and second flip-flops at a predetermined time after detection of data presence but prior to the clocking of said third and fourth flip-flops by said clock signal.

6. The invention in accordance with claim 5, including means for determining the presence of an error in accordance with the Boolean equation:

$$\text{Error} = HL.$$

* * * * *

UNITED STATES PATENT OFFICE
CERTIFICATE OF CORRECTION

Patent No. 4,097,859　　　　　　　Dated June 27, 1978

Inventor(s) Floyd W. Looschen

It is certified that error appears in the above-identified patent and that said Letters Patent are hereby corrected as shown below:

Col. 3, line 31, change "B", second occurrence, to $\overline{B}$—.
Col. 5, line 7, change "unsummetrical" to —unsymmetrical—;
　　　　line 32, change "K", second occurrence, to $\overline{K}$—.
Col. 6, line 30, change "connncted" to —connected—.
Col. 8, line 9, change "H" to $\overline{H}$—;
　　　　line 10, change "L" to $\overline{L}$—;
　　　　line 19, change "H", second occurrence, to $\overline{H}$—;
　　　　　　　change "L", second occurrence, to $\overline{L}$—.

Signed and Sealed this

Fifth Day of December 1978

[SEAL]

Attest:

RUTH C. MASON
*Attesting Officer*

DONALD W. BANNER
*Commissioner of Patents and Trademarks*